L. C. TRENT.
APPARATUS FOR TREATING SOLID BEARING SOLUTIONS.
APPLICATION FILED JUNE 12, 1912.

1,152,769.

Patented Sept. 7, 1915.
2 SHEETS—SHEET 1.

Witnesses,
Inventor,
L. C. Trent

L. C. TRENT.
APPARATUS FOR TREATING SOLID BEARING SOLUTIONS.
APPLICATION FILED JUNE 12, 1912.

1,152,769.

Patented Sept. 7, 1915.
2 SHEETS—SHEET 2.

UNITED STATES PATENT OFFICE.

LAMARTINE C. TRENT, OF LOS ANGELES, CALIFORNIA.

APPARATUS FOR TREATING SOLID-BEARING SOLUTIONS.

1,152,769.  Specification of Letters Patent.  Patented Sept. 7, 1915.

Application filed June 12, 1912. Serial No. 703,208.

*To all whom it may concern:*

Be it known that I, LAMARTINE C. TRENT, a citizen of the United States, residing at Los Angeles, in the county of Los Angeles and State of California, have invented certain new and useful Improvements in Apparatus for Treating Solid-Bearing Solutions, of which the following is a specification.

The present invention is mainly designed for settling, decanting and washing cyanid slimes or other liquids containing solids to be extracted therefrom, the action of the machine for carrying out the invention is based on the principle that the slimes will settle below a rising column of liquid meeting them within a receiving vessel, the entire body of the liquid being maintained in a condition of gentle agitation throughout the settling operation of the slimes or solids, while at the same time a barren zone of solution or wash water is kept in the receiving vessel at any convenient height in order that the descending solids will pass through said zone of wash water.

The hereinafter described apparatus is intended to receive diluted finely pulverized ore which has been crushed in water from which it is desired to reduce its liquid contents and discharge it in a thickened condition into another vessel.

The object of the invention is to gradually thicken the solids or slimes contained within the liquid under treatment and to automatically remove the same from within the receiving vessel, permitting the clear solution to be withdrawn and replaced with fresh or other solution, and to provide means whereby the solids may be completely separated from the liquid by settling, the body of the material being maintained in a condition of agitation and the thickened material forcibly discharged from the apparatus.

The improved apparatus comprises essentially a receiving vessel, means contained therein for imparting gentle agitation to the material delivered within the receiving vessel for treatment, mechanism for creating a circulation of the gradual thickening material under treatment, and means coacting therewith for supplying fresh solution for the replacement of the clear solution withdrawn from the receiving vessel.

To comprehend the invention reference should be had to the accompanying sheet of drawings, wherein—

Figure 1:
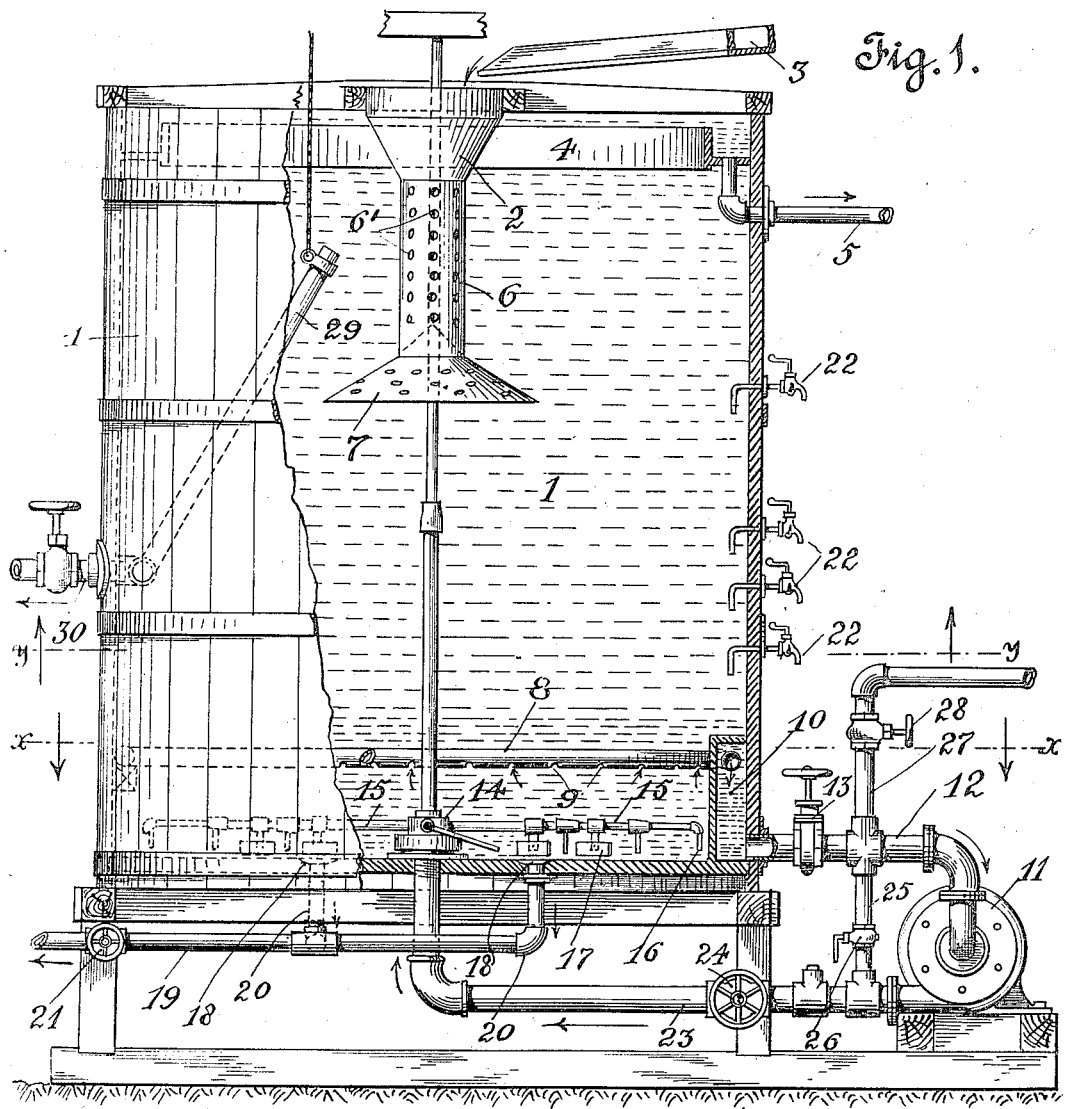
Figures 4, 5, 6:
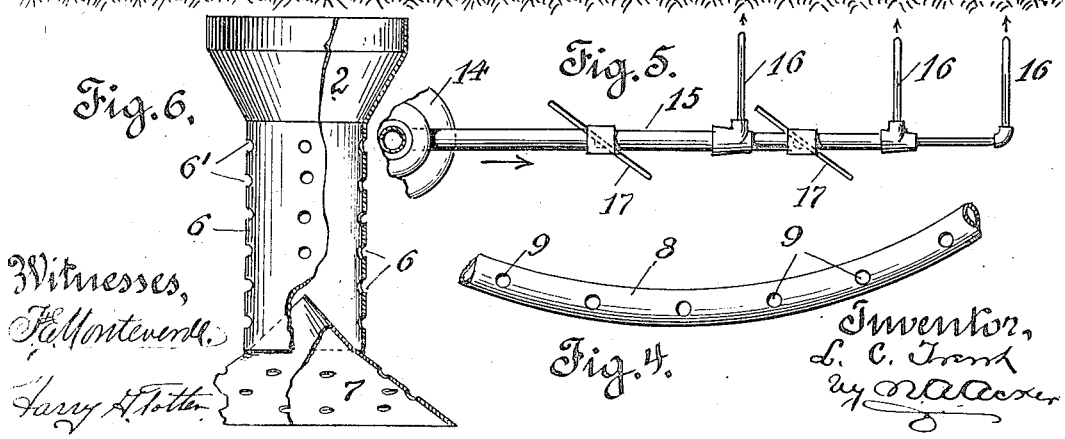
Figure 2:
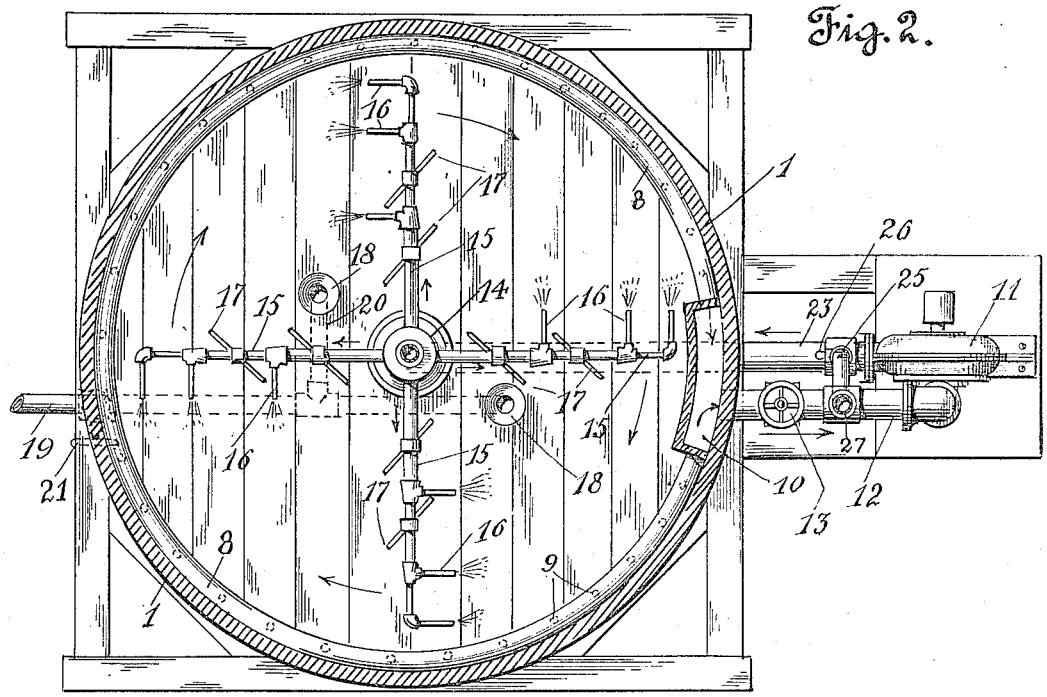
Figure 3:
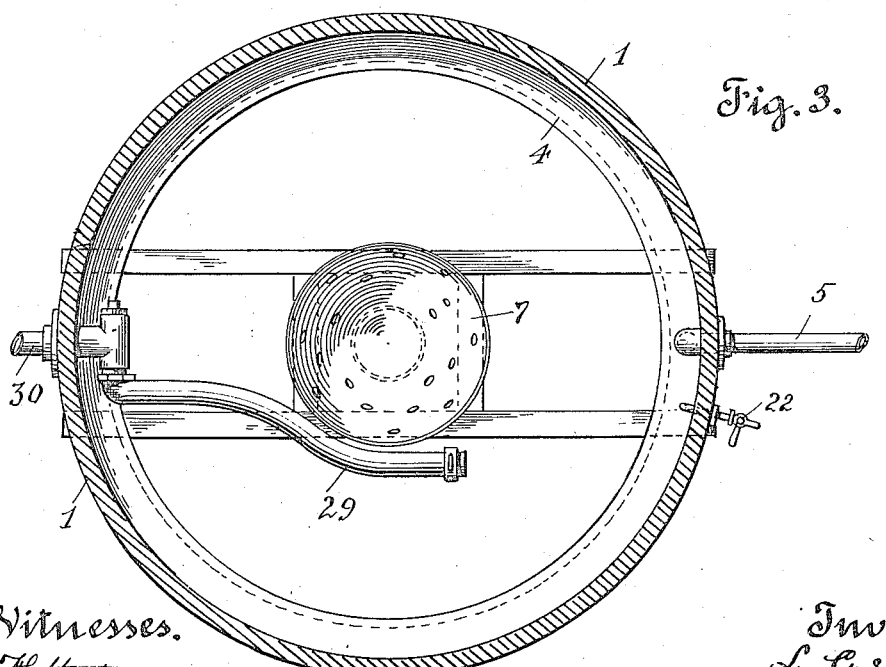

Figure 1 is a vertical sectional view of the improved apparatus for the treatment of liquid generally from which solids are to be separated, the lowered position of the decanting tube being illustrated in dotted lines. Fig. 2 is a sectional view taken on line $x$—$x$—Fig. 1 of the drawings, disclosing the general arrangement of the agitating means. Fig. 3 is a similar view taken on line $y$—$y$—Fig. 1 of the drawings, illustrating the suction pipe and its connection with the suction pump for withdrawing the partly thickened solution from within the receiving vessel and returning the same thereto through the centrifugal agitator. Fig. 4 is a broken detail view of a portion of the suction pipe of the receiver. Fig. 5 is a similar view of the centrifugal agitator. Fig. 6 is a detail view of the diffuser through which the cyanid slimes are fed into the receiving vessel.

In the drawings, the numeral 1 is used to designate any suitable form of a receiving vessel or tank for the reception of the material to be treated, the dimension of which depends on the desired tonnage capacity for the apparatus; 2 a diffuser situated within the said vessel adjacent the top thereof, and into which the mixed slimes and liquid to be treated are fed by a supply launder 3. Surrounding the upper portion of the diffuser 2 and within the vessel 1 is arranged a launder 4 for receiving the overflowing clear solution, which is discharged through the outlet pipe 5. The diffuser is provided with a depending perforated cylindrical body 6, which is closed at its lower end by means of the cone-shaped deflector 7 for gently spreading the material escaping from the diffuser into the body of liquid within the receiver.

A given distance from the bottom of the receiving tank is located a suction pipe 8, and, in order that the solution may be withdrawn from more than one point and from the entire circumference of the vessel 1, the suction pipe 8 is circular and provided with a series of inlet perforations 9. These perforations are for disturbing the inlet around the circumference of the vessel 1 and are placed in the bottom or under face of the suction pipe 8 in order that the inflow of the circulating liquid will prevent the slimes from settling in the said pipe and blocking the flow therethrough, and the said suction pipe discharges into a closed suction chamber or reservoir 10, which communicates with an exteriorly disposed suction pump 11 by means of a suction pipe 12, the flow of solution therethrough into the suction pump 11 being regulated by the controlling valve 13.

Adjacent the bottom of the receiving vessel 1 is mounted for rotation a centrifugal agitator 14, the hollow arms 15 projecting therefrom being each provided with a series of discharge nozzles 16, and by said agitator a series of adjustable scrapers 17 are carried, which serve to force the thickened slimes or mud toward the outlet openings 18 in the bottom of the receiver, through which the same escape into the delivery pipe 19 by means of the connections 20 therewith, the said delivery pipe conducting the thickened slimes to a suitable place of deposit. By means of the hand controlled valve 21 within the delivery pipe 19, the flow of material through the said pipe may be readily regulated or controlled.

The receiving vessel 1 is provided with a series of vertically disposed small try-cocks 22, the purpose of which is to permit of the solution within the upper portion of the tank or vessel 1 to be occasionally tested to ascertain whether or not it is barren or impregnated with metals or chemicals, inasmuch as the apparatus is not intended solely for the purpose of thickening solutions and separating precious metals from liquids, but equally so for the recovery of cyanid and other chemicals to be utilized for later use.

The thickened liquid material drawn into the suction pump 11 from the receiver 1 is delivered therefrom under pressure into the agitator 14 from the bottom thereof through the connecting delivery pipe 23, and entering the centrifugal agitator under pressure imparts rotation thereto as the material is discharged from the outlet nozzles or perforations 16 of the tubular arms 15, the jet streams thus discharging into the body of material within the bottom portion of the vessel 1 imparting gentle agitation thereto. By means of the hand controlled valve 24 in the delivery pipe 23, the flow of material from the pump 11 therethrough into the agitator 14 may be regulated as desired, and by means of the valve controlled by-pass connection 25 between the suction pipe 12 and the delivery pipe 23, a portion of the material flowing from the pump 11 may be by-passed from the delivery pipe 23 to the suction pipe 12, on the valve 26 of the connection 25 being opened, thus temporarily reducing the quantity flow into the suction pump and the discharge thereof to the agitator and by so doing decreasing the speed of the agitator within the receiving vessel.

In case it is desired to add fresh solution into the receiver 1 for replacement of the liquid overflowing therefrom or to supply thereto fresh water for wash purposes, the same is admitted into the suction pipe 12, on the valve 13 being closed, by means of the supply pipe 27 connected thereto, the flow of liquid therethrough being controlled by the valve 28. This by-passing of the liquid is intended for the purpose of regulating and adjusting the speed of the agitator.

A decanting pipe 29 hinged to an outlet pipe 30 is provided within the receiving vessel for drawing off the clear liquid as the solids are settled within the bottom of the receiving vessel, the said decanting tube being swung up and down in any suitable manner. By the employment of the decanting pipe or tube 29, the agitator may be stopped at any time after treatment of the solution by cutting off the flow thereto through the delivery pipe and the charge within the receiving vessel permitted to settle and the clear solution decanted therefrom to the proper point, leaving the slimes thickened to a proper consistency for delivery to filters or filter presses. The agitator may be kept in operation in such a manner as to assist in settling the slimes, the clear solution decanted during such operation, and the foul or saturated solutions may be entirely removed and replaced with fresh solution or with wash water and delivered from the overflow launder to other apparatus or receptacles.

The pump, agitator and circular suction pipe form an agitating zone at or adjacent the bottom of the receiving vessel or tank 1 to which the agitation is confined as near as possible, and this is accomplished by proper adjustment of the speed of the agitator. Where the apparatus is utilized as a thickener for slimes, the overflow launder 4 carries off the clear solution from the top after the slimes have been settled and the clear liquid is delivered through the outlet 5 to any suitable place of deposit.

In operation, the receiver 1 being constantly full of liquid, the slimes for treatment are fed from the launder 3 to the diffuser 2 above the receiver 1. The liquid in the receiver conforms to the same level in the diffuser as the surface of the receiver. A small quantity of liquid dropped into the diffuser causes it to flow into the receiver gently with as little agitation and disturbance as possible, a constant supply of liquid flowing from the diffuser into the tank. The liquid thus delivered into the diffuser flows out through the perforations 6′, some of which remain in suspension and some of the heaviest fall onto the conical distributer 7 at the bottom of the diffuser and sliding therefrom gradually intermix with the body of the solution without disturbance thereof. During this inflow into the receiver 1, the solids are gradually settled to the bottom thereof, while the clear liquid overflows into the launder 4. The sediment gradually settles and becomes thickened, the agitation imparted to the material within the zone of agitation causing all liquid to separate therefrom and rise to the upper portion of the receiving vessel. To separate all remaining liquid from within the settled slimes, it is necessary to replace the liquid in the thickened slimes at the bottom of the receiver and within the zone of agitation, which is accomplished by admitting through the supply pipe 27 into the circulating liquid passing though the pump 11 a certain proportion of clear water, which water displaces the valuable solutions which as freed rise to the upper portion of the receiver and discharge into the overflow launder, the lower portion of the receiver being converted into a zone of wash water which is replacing the settled slimes and the process is one of replacement.

Some time during the operation of cyanid solutions it is required to extract all the pregnant solution, by reason of the fact that the same become more or less saturated with precious metals and are rendered inactive, and in such case it is necessary to withdraw the pregnant solution and replace the same with fresh or more active solutions, and in this instance, fresh solutions are admitted into the pump 11 through the supply pipe 27, the same as wash water would be. That portion of the solution within the receiver above the suction pipe 8 and the horizontal level of the decanting tube 29, indicated in dotted lines—Fig. 1 of the drawings, may be treated and considered as a barren zone of solution or wash water through which the descending or settling solids pass, while all that portion below the suction pipe 8 may be treated as a zone of agitation. The agitator may be stopped during or after treatment of the material and the charge allowed to settle, the clear solution being decanted therefrom and the slimes thickened to a proper consistency for filters; also the agitator may be kept in operation in such a manner as to assist in settling the slimes, the clear solution decanted during the operation and the foul or saturated solutions entirely removed and replaced with fresh solution or with wash water, or there may be maintained a continuous overflow of clear solution and discharge of the slimes, continuously replaced with weak solution or wash water. The apparatus may be utilized for replacing the wash water or solution contained in filtered tailings for the recovery of any remaining values, alkalinity or chemical for re-use and for the recovery of water from mill tailings.

The various uses to which the invention may be successfully applied will readily appeal to those conversant with the art, inasmuch as it may be applied for the treatment of all classes of solid bearing solutions.

I am aware that various changes may be made in the details of construction as to the working parts of the apparatus without creating a departure from the described invention, and I do not wish to be understood as confining myself to the details shown and described.

Having thus described the invention what is claimed as new and desired to protect by Letters Patent is:—

1. In an apparatus for separating solids from liquids, the combination with a receiving vessel, of an agitator provided with discharge outlets rotatably mounted therein, means for removing the settled solids from within the receiving vessel, a suction pipe situated above and in close proximity to the agitator, a suction pump located outside of the receiving vessel, connection between the said pump and the suction pipe within the said vessel for the withdrawal of solution therefrom, connection between the said pump and the agitator for the delivery of the withdrawn solution thereto under pressure, and means for supplying liquid to be treated into the receiving vessel.

2. In an apparatus for separating solids from liquids, the combination with a receiving vessel, of an agitator provided with discharge outlets rotatably mounted therein, means for removing the settled solids from within the receiving vessel, a suction pipe situated above the agitator, a suction pump located outside of the receiving vessel, valve controlled connection between the said pump and the suction pipe within the said vessel for the withdrawal of solution therefrom, controlled connection between the said pump and the agitator for the delivery of the withdrawn solution thereto under pressure, a controlled by-pass connection interposed between said connections, and means for supplying liquid to be treated into the receiving vessel.

3. In an apparatus for separating solids from liquid and thickening the same, the combination with a receiving vessel, of means for supplying liquid thereto for treatment, devices for withdrawing the clear liquid from within the said vessel, an agitator rotatably mounted within the receiving vessel adjacent the bottom thereof, a suction pipe situated adjacent to the agitator, a suction pump outside the receiving vessel, valved connection between said pipe and the pump for withdrawing solution from within the vessel adjacent its bottom, valved connection between the pump and the agitator for returning the withdrawn solution into the receiving chamber through the agitator under pressure, means for supplying through the pump and agitator clear solution for replacement or wash purposes, and means controlling the discharge of the thickened solids from within the receiving vessel.

4. In an apparatus for separating solids from liquid and thickening the same, the combination with a receiving vessel, of a diffuser for supplying liquid thereto for treatment, devices for decanting and overflowing the clear liquid from within the said vessel, an agitator provided with outwardly projecting tubular discharge arms rotatably mounted within the receiving vessel adjacent the bottom thereof, a suction pipe situated above the agitator, a suction pump located outside of the receiving vessel, valved connection between said pipe and the pump for withdrawing solution from within the vessel, valved connection between the pump and the agitator for returning the withdrawn solution into the receiving chamber through the agitator under pressure, a valved by-pass connection interposed between the said valved connections, means for supplying through the pump and agitator clear solution for replacement or wash purposes, and means controlling the discharge of the thickened solids from within the receiving vessel.

5. In an apparatus for separating solids from liquids, the combination with a receiving vessel, of means for supplying thereto solutions to be treated, an agitator provided with peripheral discharges rotatably mounted within the said vessel adjacent the bottom thereof, a suction pipe provided with a series of inlet openings situated within the receiving vessel adjacent to the agitator, suction means for withdrawing solution from within the vessel through said suction pipe, connection between said means and the agitator for supplying thereto under pressure the withdrawn solution, devices controlling the discharge of solids from within the receiving vessel, and means for carrying off the clear liquid freed of its solids.

6. In an apparatus for separating solids from liquids, the combination with a receiving vessel, of means for supplying thereto solutions to be treated, an agitator provided with peripheral discharges rotatably mounted within the said vessel adjacent the bottom thereof, a circular suction pipe provided with a series of inlet openings situated within the receiving vessel above the agitator, a suction chamber within the receiving vessel into which the said pipe discharges, a suction pump located outside of the receiving vessel, valved connection between the pump and the suction chamber for withdrawing solution from within the vessel through said suction pipe, valved connection between said means and the agitator for supplying thereto under pressure the withdrawn solution, valved by-pass connection between said mentioned connections, devices controlling the discharge of solids from within the receiving vessel, and means for carrying off the clear liquid freed of its solids.

7. In an apparatus for separating solids from liquids, the combination with a receiving vessel, of means for supplying thereto liquid for treatment, an agitator rotatably mounted within the said vessel, a suction pump outside of the receiving vessel, connection between the said pump and the vessel for the withdrawal of solution therefrom, connection between the suction pump and the agitator for delivering the withdrawn solution into the agitator through the bottom thereof, a controlled by-pass connection interposed between the mentioned connections, and means for supplying fresh liquid into the receiving vessel through the pump and agitator.

8. In an apparatus for separating solids from liquids, the combination with a receiving vessel, of means for supplying liquid therein for treatment, an agitator rotatably mounted within the receiver adjacent the bottom thereof, a perforated circular suction pipe situated adjacent to the agitator, mechanism for withdrawing solution from within the vessel through the suction pipe and restoring the same thereto through the agitator under pressure, devices for withdrawing the clear liquid from within the receiving vessel, and means for replacing through the agitator by fresh liquid the withdrawn clear liquid.

9. In an apparatus for separating solids from liquids, the combination with a receiving vessel provided with a series of try-cocks, of means for supplying liquid therein for treatment, a decanting tube pivotally secured within the said vessel, an agitator rotatably mounted adjacent the bottom thereof, a perforated circular suction pipe located within the vessel above the agitator, a suction pump outside of the said vessel for withdrawing solution therefrom and restoring the same thereto under pressure through the agitator, a valved connection between the suction pipe and the pump, a valved connection between the agitator and the pump, a valved controlled by-pass connection interposed between the mentioned connection, and means for supplying fresh liquid to the receiving vessel through the pump and the agitator.

10. In an apparatus for separating, decanting, washing and replacing liquid solution containing solids, the same comprising a receiving vessel, means for supplying thereto liquid for treatment, pressure controlled rotary means within the vessel adjacent its bottom for maintaining the liquid delivered thereto in a condition of agitation, a suction pump located outside of the receiving vessel, connection between said pump and the lower portion of the vessel for the withdrawal of the thickened solution therefrom, means connected with the pump for returning the withdrawn solution into the tank through the agitating means, means for supplying fresh liquid for replacement purposes into the receiving vessel through the pump and agitator, devices for withdrawing clear solution from the said vessel, and means for withdrawing from the bottom of the tank the solids deposited therein.

11. An apparatus for the continuous separating, decanting, washing and replacing liquid solution containing solids, the same comprising a receiving vessel for the material to be treated, pressure driven rotary agitating means situated within the vessel adjacent the bottom thereof for imparting gentle agitation to the material to be treated, mechanism situated outside of the receiving vessel for withdrawing the gradually thickening liquid from within the vessel adjacent the lower portion thereof, connection between the said mechanism and the agitating means for the return of the withdrawn solution into the vessel and under pressure through the said agitating means, and means coacting with the withdrawing mechanism and the agitating means for supplying fresh solution into the receiving vessel for replacement purposes.

12. In a device of the character described, the combination of a container having an outlet in its base for the solids, and an inlet at its top for the supply of liquid to be treated, a rotary agitator member adjacent said base of the container, a suction pipe within the container adjacent said agitator, a pump without the container, said pump having communication with said suction pipe for withdrawing the gradually thickening material, and a return conduit from the pump into the container through the base thereof.

13. In a device of the character described, the combination of a container having an outlet in its base for the solids, and an inlet at its top for the supply of liquid to be treated, a rotary agitator member adjacent said base of the container, a suction pipe within the container adjacent said agitator, a pump without the container, said pump having communication with said suction pipe for withdrawing the gradually thickening material, a return conduit from the pump into the container through the base thereof, said agitator being hollow and having a series of outlets, and said return conduit being in communication with said hollow agitator whereby the latter constitutes a discharge for the return thickened material.

14. In a device of the character described, the combination of a container, an inlet at the top thereof for liquid to be treated, a pump arranged outside of the container, a conduit leading from the pump to the container adjacent the base thereof, adapted to withdraw the gradually thickening solution, a conduit leading from the pump to the container adjacent the base thereof for returning into the container the thickened solution, and a movable agitator at the base of the container.

15. In a device of the character described, the combination of a container, an inlet at the top thereof for liquid to be treated, a pump arranged outside of the container, a conduit leading from the pump to the container adjacent the base thereof, adapted to withdraw the gradually thickening solution, a conduit leading from the pump to the container adjacent the base thereof for returning into the container the thickened solution and a movable agitator at the base of the container, said agitator being hollow and rotatable and having a series of outlets, and said return conduit communicating with the interior of the container through said agitator.

16. In a device of the character described, the combination of a container, an inlet at the top thereof for liquid to be treated, a pump arranged outside of the container, a conduit leading from the pump to the container adjacent the base thereof, adapted to withdraw the gradually thickening solution, a conduit leading from the pump to the container adjacent the base thereof for returning into the container the thickened solution, a movable agitator at the base of the container, a pivoted decanting pipe arranged within the container, and means for supplying fresh water through the return conduit.

17. In a device of the character described, the combination of a container, an inlet at the top thereof for liquid to be treated, a pump arranged outside of the container, a conduit leading from the pump to the container adjacent the base thereof, adapted to withdraw the gradually thickening solution, a conduit leading from the pump to the container adjacent the base thereof for returning into the container the thickened solution and a movable agitator at the base of the container, said agitator being hollow and rotatable and having a series of outlets, and said return conduit communicating with the interior of the container through said agitator, a valve control for each conduit, and a valve controlled water supply connection for the return conduit.

18. In a device of the character described, the combination of a container having an inlet adjacent its outer end for receiving liquid for treatment, a rotary agitator adjacent the base of the container, said agitator comprising a plurality of pipes having a series of outlets, and a series of blades, a pump arranged without the container, a pipe arranged within the container above the agitator and adjacent thereto, and having a series of inlet openings, an outlet conduit in communication with the pump and with said pipe above the agitator for receiving the thickened solution from the container, and a conduit leading from the pump through the base of the container to said agitator for returning said thickened solution through the agitator into the container.

19. In a device of the character described, the combination of a container having an inlet adjacent its upper end for receiving liquid for treatment, a rotary agitator adjacent the base of the container, said agitator comprising a plurality of pipes having a series of outlets, and a series of blades, a pump arranged without the container, a pipe arranged within the container above the agitator and adjacent thereto and having a series of inlet openings, an outlet conduit in communication with the pump and with said pipe above the agitator for receiving the thickened solution from the container, and a conduit leading from the pump through the base of the container to said agitator for returning said thickened solution through the agitator into the container, a valve control for each conduit and a valve controlled fresh water connection with the return conduit.

20. In a device of the character described, the combination of a container having an inlet adjacent its outer end for receiving liquid for treatment, a rotary agitator adjacent its base of the container, said agitator comprising a plurality of pipes having a series of outlets, and a series of blades, a pump arranged without the container, a pipe arranged within the container above the agitator and adjacent thereto and having a series of inlet openings, an outlet conduit in communication with the pump and with said pipe above the agitator for receiving the thickened solution from the container, and a conduit leading from the pump through the base of the container to said agitator for returning said thickened solution through the agitator into the container, a decanting member arranged within the container above said outlet pipe, and a diffuser arranged within the container to receive the supply of liquid at the inlet.

21. In a device of the character described, the combination of a receiving vessel, means for delivering the liquid thereinto adjacent the top, a pivotally supported decanting pipe arranged within the vessel, a rotatable agitator arranged adjacent the bottom of the vessel, said agitator comprising a pipe having a series of outlets, an annular suction pipe within the vessel adjacent said agitator and thereabove, said suction pipe having a series of inlet apertures, a conduit in communication with the agitator pipe, a conduit in communication with the suction pipe, and a pump interposed between the conduits.

22. In a device of the character described, the combination of a receiving vessel, means for delivering the liquid therein adjacent the top, a diffuser for said liquid, a pivotally supported decanting pipe arranged within the vessel, a rotatable agitator arranged adjacent the bottom of the vessel, said agitator comprising a pipe having a series of outlets, and a series of blades, an annular suction pipe within the vessel adjacent said agitator and thereabove, said suction pipe having a series of inlet apertures, a conduit in communication with the agitator pipe, a conduit in communication with the suction pipe, and a pump interposed between the conduits.

In testimony whereof I have signed my name to this specification in the presence of two subscribing witnesses.

LAMARTINE C. TRENT.

Witnesses:
F. H. PEYTON,
LOUISE NUSSER.